United States Patent Office 2,967,179
Patented Jan. 3, 1961

2,967,179

DIAMINE SALTS OF 21-PHOSPHATE ESTERS OF STEROID COMPOUNDS OF THE PREGNANE AND ALLOPREGNANE SERIES

Vincent Arkley, Stoneycroft, Liverpool, and Gordon Hanley Phillipps, Greenford, England, assignors to Glaxo Laboratories Limited, Greenford, England, a British company No Drawing. Filed Apr. 14, 1959, Ser. No. 806,226

Claims priority, application Great Britain Apr. 18, 1958

28 Claims. (Cl. 260—239.5)

This invention is concerned with improvements in or relating to the preparation of steroid derivatives.

It has been shown that 21-phosphate primary and secondary esters of adreno-cortical steroids such as cortisone, hydrocortisone, prednisone and prednisolone have valuable properties not possessed by the parent steroid or their 21-acetate and similar acyloxy derivatives. In particular these 21-phosphate primary and secondary esters have the property of being water-soluble, particularly in the form of their alkali metal salts thus enabling the steroid to be administered in aqueous solution.

It is an object of the present invention to provide an improved method for the recovery and purification of 21-phosphate primary and secondary esters of compounds of the pregnane and allopregnane series. For brevity we use the term "compounds of the pregnane and allopregnane series" not only to designate compounds in which the ring is saturated but also to include compounds having ring unsaturation such as pregnenes, allopregnenes, pregnadienes, etc.

In the preparation of 21-phosphate esters, the ester is usually obtained in the form of an aqueous solution, from which it is difficult to recover and/or purify the solid ester.

In general a convenient method of recovering the desired phosphate would be by the formation of an insoluble salt thereof with, for example, an organic base but research has shown that many organic base salts of the phosphates are usually deposited as oils.

It has now been found, however, that 21-phosphate primary and secondary esters of pregnane and allopregnane compounds can be readily recovered from aqueous solutions in the form of salts of certain selected organic bases, which salts are, in general, obtainable in highly crystalline form thereby facilitating further purification of the 21-phosphate ester. Such salts are new compounds and thus represent new intermediates useful in the purification of the stated steroid compounds.

According to the invention, therefore, there is provided a process for the recovery of a 21-phosphate primary or secondary ester of a pregnane or allopregnane compound, as herein defined, from an aqueous solution of such a compound or of a salt thereof which comprises reacting such solution with an organic base of the general formula:

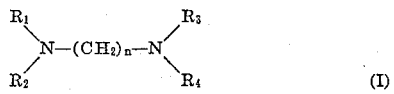

(I)

where $R_1$ and $R_3$, which may be the same or different, represent a hydrogen atom, an alkyl group containing 1–6 carbon atoms, an aryl group containing 6–12 carbon atoms or aralkyl group containing 7–12 carbon atoms, $R_2$ and $R_4$, which may be the same or different, represent a hydrogen atom or an alkyl group containing 1–6 carbon atoms or an aralkyl group or together form an alkylene chain containing 2–5 carbon atoms, and $n$ is an integer from 2 to 5, and recovering from the aqueous medium the resulting insoluble salt.

Preferably $n$ in the above general formula is 2 and, where $R_2$ and $R_4$ form an alkylene chain, the chain preferably contains 2 carbon atoms. Examples of bases of the above general formula are N:N'-dibenzylethylenediamine, piperazine and ethylenediamine.

The organic base salts prepared according to the invention from steroid phosphates having therapeutic utility themselves possess useful pharmacological action and make possible pharmaceutical formulation of the steroid phosphates in water-insoluble form. The base salt obtained in accordance with the invention can be readily further purified by recrystallisation, e.g., from hot aqueous media.

The resulting salt may thereafter be converted to the free phosphoric acid ester or to an alkali metal salt. This may be achieved by passage of a solution of the salt through a suitable ion-exchange resin. Preferably the ion-exchange resin is in the H+ form and, if an alkali metal salt is desired, the resulting free phosphoric acid ester may be titrated with the appropriate alkali metal hydroxide or passed through a cation exchange resin in the salt form.

The process according to the invention is of particular application in the purification and isolation of 21-phosphate primary and secondary esters of steroids having a keto group in the 20-position and especially compounds having adreno-cortical or anti-inflammatory activity e.g. cortisone, hydrocortisone, prednisone and prednisolone and analogues thereof, e.g. those containing one or more of the following substituents, 2-methyl, 6-methyl, 9-halo, 16-hydroxy, -acyloxy or -alkyl, e.g. a 9α-fluoro-16-methyl prednisolone, and inactive precursors thereof.

Pregnane and allopregnane compounds, the 21-phosphate primary and secondary esters of which may with advantage be recovered and/or purified by the process according to the invention, are those having the general formula:

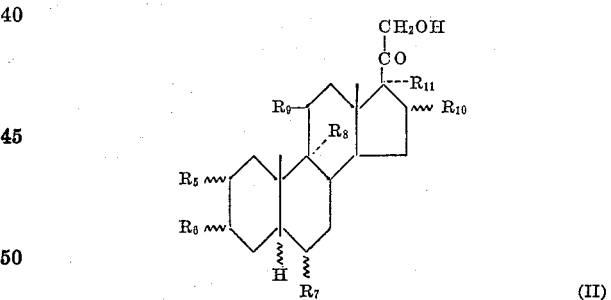

(II)

where:

$R_5$ represents a hydrogen atom or a methyl group;
$R_6$ represents a hydroxy or acyloxy group or a ketonic oxygen atom;
$R_7$ represents a hydrogen or a halogen, particularly fluorine, atom or a methyl group;
$R_8$ represents a hydrogen atom or a halogen, particularly fluorine, atom;
$R_9$ represents a hydroxy group or a ketonic oxygen atom;
$R_{10}$ represents a hydrogen atom or a hydroxy, acyloxy, particularly acetoxy, or alkyl, particularly methyl, group;
$R_{11}$ represents a hydrogen atom or a hydroxy or acyloxy, particularly acetoxy, group;

together with the corresponding $\Delta^1$, $\Delta^4$, $\Delta^5$ and $\Delta^{1,4}$ compounds. The phosphate esters subjected to the present process may be in solution as such (where sufficiently soluble) or in the form of a water-soluble, e.g. alkali metal, alkaline earth metal or ammonium, salt.

The present invention also includes within its scope as new compounds the salt obtained by the process according to the invention, in particular salts of bases of the general Formula I with 21-phosphate primary and secondary esters of steroids of the general Formula II and of the corresponding $\Delta^1$, $\Delta^4$, $\Delta^5$ and $\Delta^{1,4}$ compounds.

In order that the invention may be well understood, the following examples are given by way of illustration only:

EXAMPLE 1

Prednisolone disodium phosphate (0.146 g.) dissolved in water (5 ml.) was added to a cooled solution of N:N'-dibenzylethylenediamine diacetate (0.12 g.) in water (5 ml.). The precipitate (0.169 g.; 82%) was collected, washed with water and dried first over phosphorous pentoxide and then at 60° C./0.1 mm.

Recrystallisation from hot water gave prednisolone N:N'-dibenzylethylenediamine phosphate monohydrate (M.P. 120–135° C.) $[\alpha]_D^{20} + 81°$ (c.=1.05 in alcohol); $\lambda$ max. (EtOH) 242.5 m$\mu$;

$$E_{1cm}^{1\%} \ 217$$

(Found: C, 63.8; H, 7.6; N, 4.3; P, 4.4.

$$C_{37}H_{49}O_8N_2P \cdot H_2O$$

requires C, 63.6; H, 7.3; N, 4.1; P, 4.4%.)

EXAMPLE 2

Following the procedure of Example 1 but replacing N:N'-dibenzylethylenediamine by piperazine, gave prednisolone piperazine phosphate dihydrate (M.P. 225–230° C. (decomp.)) $[\alpha]_D^{20} + 76°$ (c.=0.03 in water); $\lambda$ max. (H$_2$O) 246.5 m$\mu$;

$$E_{1cm}^{1\%} \ 278$$

(Found: C, 53.4; H, 7.9; N, 5.3; P, 6.2.

$$C_{25}H_{39}O_8N_2P \cdot 2H_2O$$

requires C, 53.4; H, 7.7; N, 5.0; P, 5.5%.)

EXAMPLE 3

Following the procedure of Example 1 but replacing N:N'-dibenzylethylenediamine by ethylenediamine gave prednisolone ethylenediamine phosphate (M.P. 185° C.) $[\alpha]_D^{20} + 81°$ (c.=?.2 in alcohol).

EXAMPLE 4

Following the procedure of Example 1 but replacing prednisolone disodium phosphate by hydrocortisone disodium phosphate gave hydrocortisone N:N'-dibenzylethylenediamine phosphate monohydrate, M.P. 129–131° C. $[\alpha]_D^{20} + 93.5°$ (c.=1.0 in alcohol); $\lambda$ max. (H$_2$O) 248 m$\mu$;

$$E_{1cm}^{1\%} \ 245$$

(Found: C, 63.7; H, 7.4; N, 4.3; P, 4.2%.

$$C_{37}H_{51}O_8N_2P \cdot H_2O$$

requires C, 63.5; H, 7.6; N, 4.0; P, 4.4%.)

EXAMPLE 5

Following the procedure of Example 2 but replacing prednisolone disodium phosphate by hydrocortisone disodium phosphate, gave hydrocortisone piperazine phosphate dihydrate, M.P. 228° C. (decomp.) $[\alpha]_D^{20} + 101.4°$ (c.=0.0814 in H$_2$O, 4 dm. tube); $\lambda$ max. (H$_2$O) 247 m$\mu$;

$$E_{1cm}^{1\%} \ 296$$

(Found: C, 52.7; H, 8.1; N, 5.0; P, 5.9%.

$$C_{25}H_{41}O_8N_2P \cdot 2H_2O$$

requires C, 53.2; H, 8.0; N, 5.0; P, 5.5%.)

EXAMPLE 6

*Bis-hydrocortisone piperazine phosphate*

Bis-hydrocortisone sodium phosphate (25 mg.) dissolved in water (0.5 ml.) and added to a solution of piperazine diacetate (20 mg.) in water (0.5 ml.) precipitated bis-hydrocortisone piperazine phosphate (16 mg. after washing with water and drying 60° C./0.1 mm. for 1 hour).

EXAMPLE 7

*Bis-prednisolone piperazine phosphate*

Substituting bis-prednisolone sodium phosphate for bis-hydrocortisone sodium phosphate in Example 6 gave bis-prednisolone piperazine phosphate (22 mg.).

EXAMPLE 8

*Bis-hydrocortisone N:N'-dibenzylethylenediamine phosphate*

A solution of bis-hydrocortisone sodium phosphate (25 mg.) in water (0.5 ml.) added to N:N'-dibenzylethylenediamine diacetate (12 mg.) in water (0.5 ml.) and the mixture diluted with more water (1 ml.) gave a precipitate of bis-hydrocortisone N:N'-dibenzylethylenediamine phosphate (23 mg. after drying, 60° C./0.1 mm.).

EXAMPLE 9

*Bis-prednisolone N:N'-dibenzylethylenediamine phosphate*

Substituting bis-prednisolone sodium phosphate (25 mg.) for bis-hydrocortisone sodium phosphate in Example 8 gave bis-prednisolone N:N'-dibenzylethylenediamine phosphate (26 mg.).

EXAMPLE 10

*Hydrocortisone benzyl N:N'-dibenzylethylenediamine phosphate*

Substituting hydrocortisone sodium benzyl phosphate (33 mg.) for bis-hydrocortisone sodium phosphate in Example 8, gave hydrocortisone benzyl N:N'-dibenzylethylenediamine phosphate (42 mg.).

EXAMPLE 11

*Hydrocortisone benzyl piperazine phosphate*

Substituting hydrocortisone sodium benzyl phosphate (33 mg.) for bis-hydrocortisone sodium phosphate in Example 6 gave hydrocortisone benzyl piperazine phosphate (36 mg.).

EXAMPLE 12

*3β:17α:21-trihydroxy-5α-pregnane-11:20-dione 21-N:N'-dibenzylethylenediamine phosphate*

An ice-cold solution of 3β:17α:21-trihydroxy-5α-pregnane-11:20-dione 21-disodium phosphate (0.25 g.) in water (5 ml.) was treated with a solution of N:N'-dibenzylethylenediamine diacetate (0.2 g.) in water (5 ml.). The precipitated salt was filtered off, washed with water (5 ml.) and dried at 60° C./0.1 mm. Crystallisation of the resulting solid (0.155 g.) from hot water gave the salt as clusters of needles, M.P. 178–179° C. $[\alpha]_D^{20} + 48.4°$ (c., 0.93 in ethanol). (Found: C, 64.9; H, 7.55; N, 4.2; P, 4.7. $C_{37}H_{53}O_8N_2P$ requires C, 64.9; H, 7.7; N, 4.1; P, 4.5%.)

EXAMPLE 13

*3β:17α:21-trihydroxy-5α-pregnane-11:20-dione 21-piperazine phosphate*

A hot solution of piperazine acetate (0.4 g.) in water (5 ml.) was added to a hot solution of 3β:17α:21-trihydroxy-5α-pregnane-11:20-dione 21-disodium phosphate (0.488 g.) in water (5 ml.) and the mixture was diluted with water (10 ml.) and heated on the steam bath for 5 minutes. The mixture was cooled and the solid (0.44 g.) filtered off, washed with cold water (10 ml.) and dried. Crystallisation from a large volume of hot water gave the salt as a microcrystalline solid, M.P. 224° C. (decomp.) $[\alpha]_D^{20} + 30.9°$ (c., 0.97 in H$_2$O). (Found: C, 56.4; H, 8.1; N, 5.1; P,6.2. $C_{25}H_{43}O_8N_2P$ requires C, 56.6; H, 8.1; N, 5.3; P, 5.85%.)

EXAMPLE 14

*4:5α-dihydrocortisol piperazine phosphate*

Hydrocortisone dibenzyl phosphate (1.0 g.) in absolute ethanol (100 ml.) was added to pre-reduced 2% palladium-on-carbon catalyst (0.5 g.) in absolute ethanol (125 ml.) under hydrogen at 16° C./738 mm. Hydrogen was rapidly absorbed on shaking, and after 20 min. the hydrogenation was complete (116.7 ml. $H_2O$). The catalyst was filtered off, washed with alcohol (100 ml.) and the combined filtrate evaporated to dryness in vacuo. The residue (0.63 g.) in 50% aqueous alcohol (25 ml.) was titrated to pH 8.6 with 0.5 N sodium hydroxide. After removal of the alcohol in vacuo, piperazine diacetate (0.5 g.) was added. The precipitated salt was collected and recrystallised from hot water to give 4:5α-dihydrocortisol piperazine phosphate as clusters of needles (0.231 g.), M.P. 227–234° C. (decomp.), $[\alpha]_D^{20}+46.8°$ (c., 0.075 in water). (Found: C, 54.0; H, 8.35; N, 5.2; P, 6.0. $C_{25}H_{43}O_8N_2P.H_2O$ requires C, 54.7; H, 8.2; N, 5.1; P, 5.6%.)

EXAMPLE 15

*9α-fluoro-11β:17α:21-trihydroxy-16α-methylpragna-1:4-diene-3:20-dione 21-piperazine phosphate*

9α - fluoro - 11β:17α:21 - trihydroxy - 16α - methylpregna-1:4-diene-3:20-dione 21-disodium phosphate (prepared from the corresponding 21-hydroxy-compound by the method described in copending application Serial No. 774,578, filed November 18, 1958), was treated with piperazine diacetate in aqueous solution by the method of Example 6 to give the crystalline piperazine phosphate, M.P. 227–236° C. (decomp.), λ max. (in $H_2O$) 242 mμ, $E_{1cm.}^{1\%}$ 282

EXAMPLE 16

*Conversion of prednisolone piperazine phosphate to prednisolone disodium phosphate*

The piperazine salt (0.445 g.) was shaken with an excess of Zeo-Karb 225 resin ($H^+$ form) in warm methanol (50 ml.) until all the piperazine salt had dissolved (30 min.). The resin was removed by filtration and the filtrate passed through a column of Zeo-Karb 216 resin (Na+ form), and elution was continued with more methanol (25 ml.). Evaporation of the eluate under reduced pressure and addition of acetone gave prednisolone disodium phosphate (0.249 g.) as a white powder, λ max. (in $H_2O$) 246.5 mμ

$E_{1cm.}^{1\%}$ 292

We claim:

1. In a process for the recovery of 21-phosphate esters of a compound selected from the group consisting of a steroid compound of the pregnane series and a steroid compound of the allopregnane series from a solution of the ester in an aqueous medium, the steps of reacting said solution with an organic base selected from the group consisting of a base having the formula

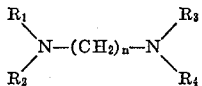

where $R_1$ and $R_3$ are each a member selected from the group consisting of hydrogen, an alkyl group containing 1–6 carbon atoms, an aryl group containing 6–12 carbon atoms and an aralkyl group containing 7–12 carbon atoms, $R_2$ and $R_4$ are each a member selected from the group consisting of hydrogen, an alkyl group containing 1–6 carbon atoms and a benzyl group and $n$ is an integer from 2 to 5 and a base having the formula $$R_1-N\underset{(CH_2)_n}{\overset{(CH_2)_n}{<}}N-R_3$$

where $R_1$, $R_3$ and $n$ have the above meaning; and separating the resulting insoluble crystalline salt from the aqueous medium.

2. The process of claim 1 in which said ester is a primary ester.
3. The process of claim 1 in which said ester is a secondary ester.
4. The process of claim 1 in which $n$ is 2.
5. The process of claim 1 in which said steroid compound is prednisone.
6. The process of claim 5 in which said organic base is N:N¹-dibenzylethylenediamine.
7. The process of claim 5 in which said organic base is piperazine.
8. The process of claim 5 in which said organic base is ethylenediamine.
9. The process of claim 1 in which said steroid compound is prednisolone.
10. The process of claim 9 in which said organic base is N:N¹-dibenzylethylenediamine.
11. The process of claim 9 in which said organic base is piperazine.
12. The process of claim 9 in which said organic base is ethylenediamine.
13. As new compounds, the salts of an organic base selected from the group consisting of N:N¹-dibenzylethylenediamine, piperazine and ethylenediamine and a 21-phosphate ester of a steroid compound selected from the group consisting of a compound having the formula

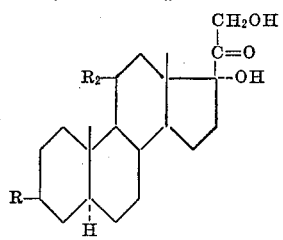

where R is a member selected from the group consisting of a hydroxy group and a keto group and $R_2$ is a member selected from the group consisting of a hydroxy group and a keto group, a compound having the formula

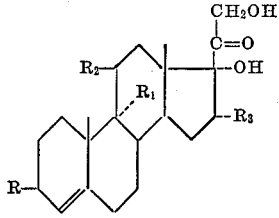

where R is a member selected from the group consisting of a hydroxy group and a keto group, $R_1$ is a member selected from the group consisting of hydrogen and fluorine atoms, $R_2$ is a member selected from the group consisting of a hydroxy group and a keto group, $R_3$ is a member selected from the group consisting of hydrogen and a methyl group and the $\Delta^{1:4}$ compounds corresponding to said last-mentioned compound.

14. Prednisolone N:N¹-dibenzylethylenediamine phosphate.
15. Prednisolone piperazine phosphate.
16. Prednisolone ethylenediamine phosphate.
17. Hydrocortisone N:N¹ - dibenzylethylenediamine phosphate.
18. Hydrocortisone piperazine phosphate.
19. Bis-hydrocortisone piperazine phosphate.
20. Bis-prednisolone piperazine phosphate.
21. Bis-hydrocortisone N:N¹-dibenzylethylenediamine phosphate.
22. Bis-prednisolone N:N¹ - dibenzylethylenediamine phosphate.
23. Hydrocortisone benzyl N:N¹-dibenzylethylenediamine phosphate.

24. Hydrocortisone benzyl piperazine phosphate.
25. 3β:17α:21-trihydroxy-5α-pregnane-11:20-dione 21-N:N¹-dibenzylethylenediamine phosphate.
26. 3β:17α:21-trihydroxy-5α-pregnane-11:20-dione 21-piperazine phosphate.
27. 4:5α-dihydrocortisol piperazine phosphate.
28. 9α - fluoro - 11β:17α:21 - trihydroxy - 16α - methylpregna-1:4-dione-3:20-dione 21-piperazine phosphate.

References Cited in the file of this patent

UNITED STATES PATENTS

| | | |
|---|---|---|
| 2,642,427 | Hasbrouck | June 16, 1953 |
| 2,666,066 | Hasbrouck | Jan. 12, 1954 |
| 2,779,775 | Sarett | Jan. 29, 1957 |
| 2,789,117 | Sarett | Apr. 16, 1957 |
| 2,870,177 | Conbere et al. | Jan. 20, 1959 |